(12) United States Patent
Paniraj et al.

(10) Patent No.: US 12,497,355 B2
(45) Date of Patent: Dec. 16, 2025

(54) PROCESS FOR PREPARATION OF MESOTRIONE AND ITS INTERMEDIATES

(71) Applicant: RALLIS INDIA LIMITED, Maharashtra (IN)

(72) Inventors: A.S. Paniraj, Karnataka (IN); Suresh D. Kumar, Karnataka (IN); Adithya S.V.R., Karnataka (IN)

(73) Assignee: RALLIS INDIA LIMITED, Maharashtra (IN)

( * ) Notice: Subject to any disclaimer, the term of this patent is extended or adjusted under 35 U.S.C. 154(b) by 500 days.

(21) Appl. No.: 18/019,070

(22) PCT Filed: Jul. 31, 2021

(86) PCT No.: PCT/IB2021/057013
§ 371 (c)(1),
(2) Date: Jan. 31, 2023

(87) PCT Pub. No.: WO2022/024094
PCT Pub. Date: Feb. 3, 2022

(65) Prior Publication Data
US 2023/0303487 A1    Sep. 28, 2023

(30) Foreign Application Priority Data

Jul. 31, 2020 (IN) .............................. 202021032977

(51) Int. Cl.
*C07C 303/30* (2006.01)

(52) U.S. Cl.
CPC ................................. *C07C 303/30* (2013.01)

(58) Field of Classification Search
CPC .................................................... C07C 303/30
See application file for complete search history.

(56) References Cited

FOREIGN PATENT DOCUMENTS

WO  WO2016197900 A1 * 12/2016
WO  WO2018178860 A1 * 10/2018

* cited by examiner

*Primary Examiner* — Adam C Milligan
*Assistant Examiner* — Karen Cheng
(74) *Attorney, Agent, or Firm* — Haynes Beffel & Wolfeld LLP; Andrew L. Dunlap

(57) ABSTRACT

The present disclosure provides a new and improved process for preparation of intermediate compounds and synthesis of mesotrione therefrom. The present disclosure provides an economical, efficient and eco-friendly process for preparation of mesotrione.

10 Claims, No Drawings

PROCESS FOR PREPARATION OF MESOTRIONE AND ITS INTERMEDIATES

FIELD OF THE INVENTION

The present disclosure relates to technical field of organic synthesis. In particular, the present disclosure relates to a process for preparation of intermediates of mesotrione, and preparation of mesotrione there from, which is useful as herbicide.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Mesotrione, a potent and highly selective inhibitor of 4-hydroxyphenylpyruvate dioxygenase (HPPD), is a member of the benzoylcyclohexane-1, 3-dioneherbicides. It has been widely used for the selective pre- and post-emergence control of a wide range of broadleaf weeds in the field of corn, seed corn, yellow popcorn and sweet corn. Mesotrione is chemically known as 2-(4-(methylsulfonyl)-2-nitrobenzoyl) cyclohexane-1,3-dione. Mesotrione has the structural formula given below:

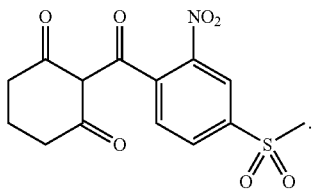 [SMILES: CS(=O)(=O)c1ccc(C(=O)C2C(=O)CCCC2=O)c([N+](=O)[O-])c1]

Mesotrione possesses a broad spectrum of activity on various broad leaf weeds and grasses, for example, *Abutilon theophrasti, Xanthiurn strumarium, Ambrosia trifida* L, *Chenopodium, Amaranthus* and *Polygonum* species and *Digitaria* and *Echinochloa* species. Mesotrioneis useful in controlling weeds that are already present in crop by spraying, and controlling merging weeds by applying to soil. Various studies have shown that mesotrione does not show crop injury with pre-emergence and post-emergence applications and does not affect yield of crops at recommended doses.

The U.S. Pat. No. 7,820,863 describes a process for preparation of mesotrione. In this patent reference, mesotrione is prepared by (i) oxidation of 2-nitro-4-methylsulphonyl toluene (NMST) to give 2-nitro-4-methylsulphonyl benzoic acid (NMSBA), (ii) conversion of NMSBA to 2-nitro-4-methylsulphonyl benzoyl chloride (NMSBC), and (iii) reacting cyclohexanedione with 2-nitro-4-methylsulphonyl benzoyl chloride (NMSBC) to form an enol ester followed by a rearrangement process to give mesotrione, as shown in the following reaction scheme:

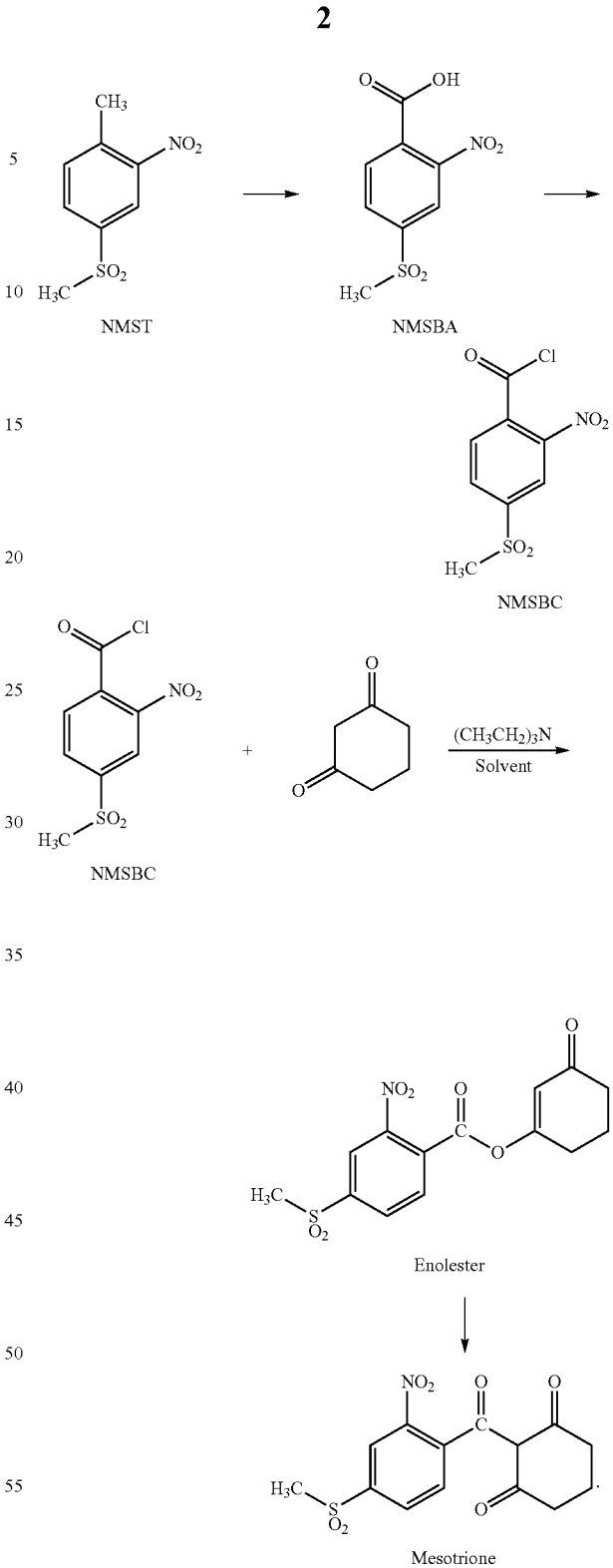

The U.S. Pat. No. 5,591,890 discloses a process for preparation of 2-nitro-4-methylsulfonyl benzoic acid (NMSBA) by oxidation of 2-nitro-4-methylsulfonyl toluene (NMST) in the presence of a cobalt salt as a catalyst. In particular, the oxidation is carried out in the presence of acetic acid and acetate ion and using cobalt(II) acetate tetra hydrate as a catalyst.

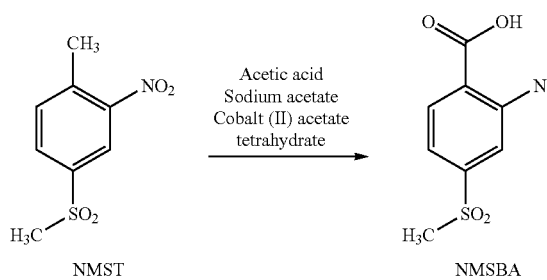

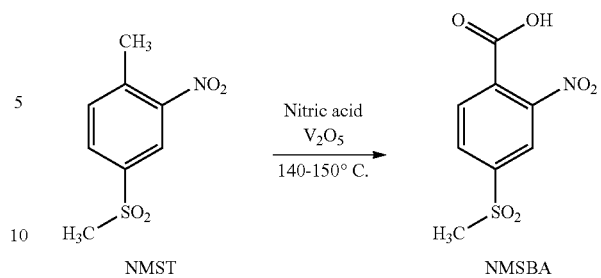

The U.S. Pat. No. 5,424,481 describes a process for preparation of methyl sulfonyl benzoic acids comprising oxidizing the corresponding methylsulfonyl toluenes with nitric acid and sulfuric acid in the presence of vanadium or cobalt compounds. In particular, oxidation of 2-nitro-4-methylsulphonyl toluene (NMST) is carried out in the presence of sulfuric acid and nitric acid using vanadium pentoxide as a catalyst to obtain 2-nitro-4-methylsulfonyl benzoic acid (NMSBA).

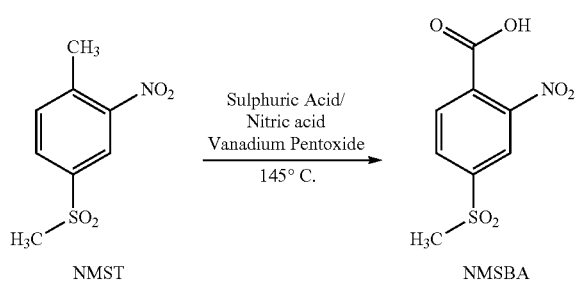

The Chinese patent application, CN105669504A discloses a process for the preparation of 2-nitro-4-methylsulfonylbenzoic acid (NMSBA) by oxidation of 2-nitro-4-methylsulfonyltoluene (NMST). Specifically, the oxidation of NMST is carried out in presence of sulphuric acid and nitric acid using vanadium pentoxide as a catalyst.

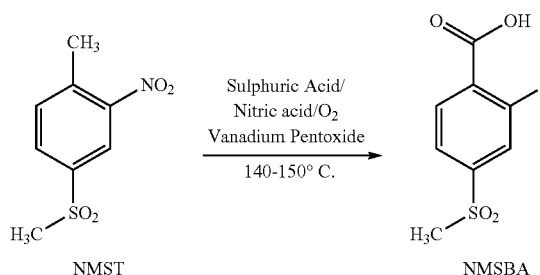

The Chinese patent application, CN106565561A discloses a process for the preparation of 2-nitro-4-methylsulfonylbenzoyl benzoyl chloride. In the process of preparing 2-nitro-4-methylsulfonylbenzoyl benzoyl chloride, a step of oxidation of 2-nitro-4-methylsulfonyltoluene (NMST) is carried out in presence of nitric acid using vanadium pentoxide as a catalyst to obtain 2-nitro-4-methylsulfonylbenzoic acid (NMSBA).

However, the processes known in the art for preparing mesotrione and its intermediate involve tedious procedures, e.g. a relatively greater number of steps, which includes conversion of NMSBA to NMSBC, as well as isolation and purification of intermediates at each step. This result in excessive production time, which in turn renders the processes more costly and less eco-friendly, thus the processes are not suitable for commercial scale up. The known processes further involve use of high amount of solvents that leads to production of high volume of effluent.

There is thus a need in the art to provide a new, improved and highly efficient process for preparation of mesotrione. The present disclosure satisfies the existing needs, as well as others, and generally overcomes the deficiencies found in the prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

OBJECTS OF THE INVENTION

It is an object of the present disclosure to provide a new and improved process for preparation of intermediate compounds for synthesis of mesotrione.

It is another object of the present disclosure to provide an economical, efficient and eco-friendly process for preparation of mesotrione.

SUMMARY OF THE INVENTION

The foregoing and other objects are attained by the present disclosure, which in one aspect provides a process for preparation of 2-nitro-4-methylsulphonyl benzoic acid (NMSBA) of formula (III) by oxidation of 2-nitro-4-methylsulfonyl toluene (NMST) of formula (IV) using an oxidant in presence of ruthenium (IV) oxide ($RuO_2$) as a catalyst.

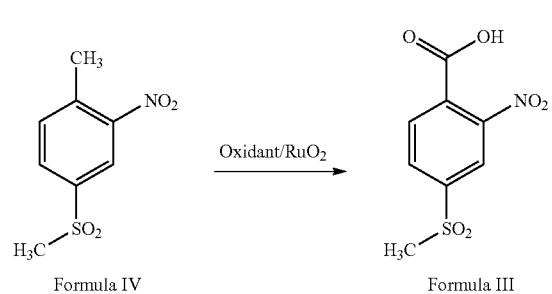

In another aspect, there is provided a process for preparation of an enol ester of formula (II) by reaction of 2-nitro-4-methylsulphonyl benzoic acid (NMSBA) of formula (III) with 1,3-cyclohexanedione. The method disclosed herein is extremely advantageous over the methods existing in the art for the preparation of enol ester, in that it does not require the additional step of converting NMSBA to an intermediate of 2-nitro-4-methylsulphonyl benzoyl chloride (NMSBC).

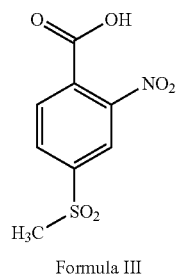

Formula III

In yet another aspect, there is provided a process for preparation of mesotrione of formula (I), which can include the steps of:

(i) oxidizing 2-nitro-4-methylsulfonyl toluene (NMST) of formula (IV) with an oxidant in presence of ruthenium (IV) oxide (RuO$_2$) as a catalyst, to produce 2-nitro-4-methylsulphonyl benzoic acid (NMSBA) of formula (III);

Formula IV → Oxidant/RuO$_2$ → Formula III (ii) reacting NMSBA of formula (III) with 1,3-cyclohexanedione to produce an enol ester of formula (II); and Formula III + cyclohexanedione → Formula II (iii) converting the enol ester of formula (II) to mesotrione of formula (I)

Formula II → Formula I

Various objects, features, aspects and advantages of the inventive subject matter will become more apparent from the following detailed description of preferred embodiments.

DETAILED DESCRIPTION OF THE INVENTION

The following is a detailed description of embodiments of the present disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." The term "about" may refer to ±5 of the specific figure preceding the term "about". Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Not withstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it is individually recited herein.

All processes described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

It should also be appreciated that the present invention can be implemented in numerous ways, including as a system, a method or a device. In this specification, these implementations, or any other form that the invention may take, may be referred to as processes. In general, the order of the steps of the disclosed processes may be altered within the scope of the invention.

Various terms as used herein are shown below. To the extent a term used in a claim is not defined below, it should be given the broadest definition persons in the pertinent art have given that term as reflected in printed publications and issued patents at the time of filing.

The compound of formula (I), refers to mesotrione,2-(4-(methylsulfonyl)-2-nitrobenzoyl) cyclohexane-1, 3-dione, having the chemical formula:

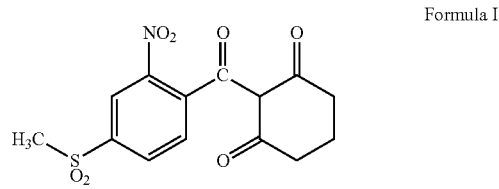 [SMILES: CS(=O)(=O)c1ccc(C(=O)C2C(=O)CCCC2=O)c([N+](=O)[O-])c1]

Formula I

In certain embodiments, there is provided a process for preparation of 2-nitro-4-methylsulphonyl benzoic acid (NMSBA) of formula (III) by oxidation of 2-nitro-4-methylsulfonyl toluene (NMST) of formula (IV) with an oxidant in presence of ruthenium (IV) oxide ($RuO_2$) as a catalyst.

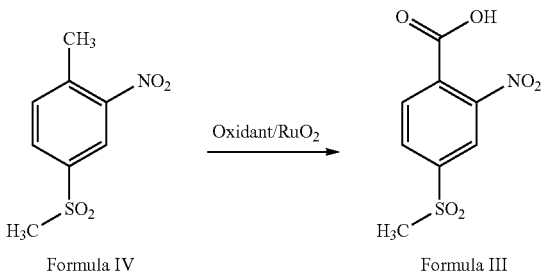

Formula IV    Formula III

According to embodiments of the present disclosure, the oxidant employed in the above reaction may be any oxidizing agent that can promote the target oxidation reaction. Examples of oxidizing agent include alkali metal hypochlorite and peroxide such as hydrogen peroxide.

In certain embodiments, the ruthenium catalyst is oxidized by the hypochlorite to produce a mixture of ruthenate, perruthenate and ruthenium tetroxide. Preferably, oxidized to the ruthenate. At the end of the reaction, the ruthenium oxide is an insoluble solid present in substantially the same amount as initially so it can be filtered off and reused (for >50 conversion), even without treatment, in another cycle. The ruthenium can be supplied to the reaction solution in the form of a salt or an oxide, ruthenium dioxide and ruthenium dioxide hydrate. Preferably, in the form of ruthenium dioxide hydrate.

In another embodiment, the ruthenium catalyst can be in the form of salt such as ruthenium trichloride. The catalyst $RuO_2$ can be formed in situ in a reaction commencing with ruthenium trichloride in an aqueous caustic solution containing starting material and purging chlorine gas.

In at least one embodiment, 2-nitro-4-methylsulfonyl toluene (NMST) of formula (IV) can be oxidized to 2-nitro-4-methylsulphonyl benzoic acid (NMSBA) of formula (III) with $RuO_2$ as a catalyst and cheap and readily available sodium hypochlorite (NaOCl) as an oxidant. In certain embodiments, the mixture of 2-nitro-4-methylsulfonyl toluene (NMST) of formula (IV), $RuO_2$ catalyst and sodium hypochlorite (NaOCl) can be heated to reflux temperature under stirring for about more than 2 hours, 3 hours, 4 hours, or 5 hours, preferably in the range of about 2 hours to about 8 hours, more preferably for about 6 hours to about 8 hours.

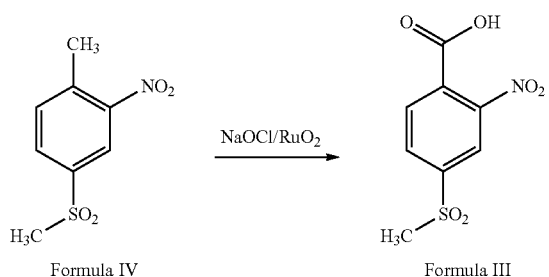

In certain embodiments, there is provided a process for preparation of an enol ester of formula (II) by reaction of 2-nitro-4-methylsulphonyl benzoic acid (NMSBA) of formula (III) with 1, 3-cyclohexanedione. This method is extremely advantageous over the prior art methods for the preparation of enol ester, in that it does not require the additional step of converting NMSBA to an intermediate of 2-nitro-4-methylsulphonyl benzoyl chloride (NMSBC).

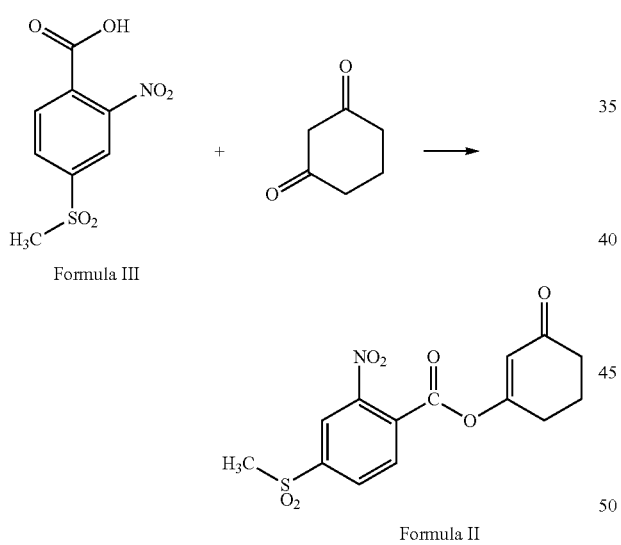

In at least one embodiment, the enol ester of formula (II) can be prepared by reacting NMSBA of formula (III) with 1, 3-cyclohexanedionein presence of N,N'-dicyclohexylcarbodiimide and a solvent. The solvent may be any solvent in which NMSBA of formula (III) and/or 1,3-cyclohexanedione may be soluble. Examples of solvent include dichloromethane, dichloroethane, dichloropropanes, dichlorobutanes, dichloropentanes, and mixtures thereof. Preferably, the solvent can be dichloromethane. In various embodiments, the disclosed process can produce enol ester of formula (II) in high yields, e.g. at least 65%, with a purity of at least 85%. In another embodiment, the disclosed process can produce solvent recovery of >85%.

In certain embodiments, there is provided a process for preparation of enol ester of formula (II) using 2-nitro-4-methylsulfonyl toluene (NMST) of formula (IV) as starting material, wherein the process can include the steps of:

(i) oxidation of 2-nitro-4-methylsulfonyl toluene (NMST) of formula (IV) with an oxidant in presence of ruthenium (IV) oxide as a catalyst, to produce 2-nitro-4-methylsulphonyl benzoic acid (NMSBA) of formula (III); and

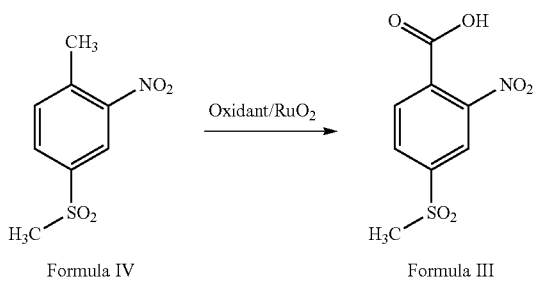

(ii) reaction of NMSBA of formula (III) with 1,3-cyclohexanedione to produce enol ester of formula (II).

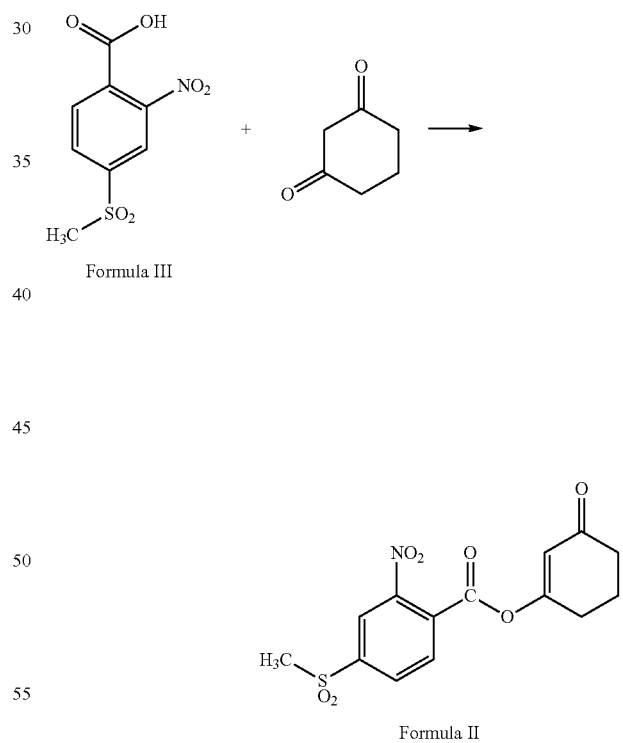

In certain embodiments, there is provided a process for preparation of mesotrione of formula (I), which includes the steps of:

(i) oxidation of 2-nitro-4-methylsulfonyl toluene (NMST) of formula (IV) with an oxidant in presence of ruthenium (IV) oxide as a catalyst, to produce 2-nitro-4-methylsulphonyl benzoic acid (NMSBA) of formula (III);

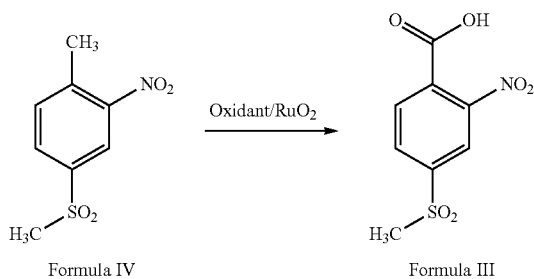 [SMILES: Cc1ccc(S(C)(=O)=O)cc1[N+](=O)[O-] ; CS(=O)(=O)c1ccc(C(=O)O)c([N+](=O)[O-])c1]

Formula IV → Formula III (ii) reaction of NMSBA of formula (III) with 1,3-cyclohexanedione to produce enol

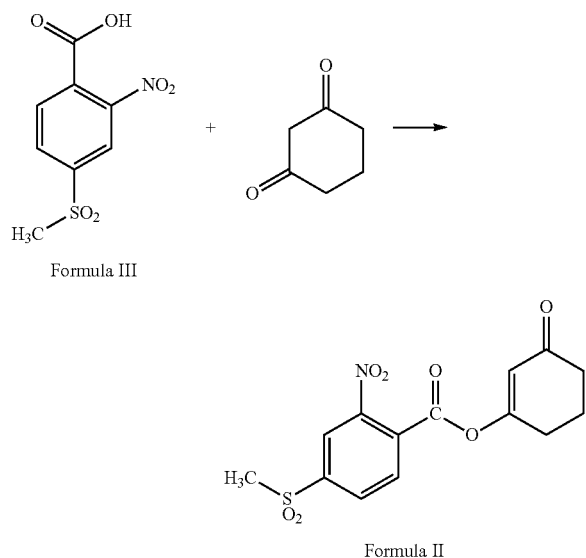

Formula III

Formula II ester of formula (II); and (iii) conversion of the enol ester of formula (II) to mesotrione of formula (I)

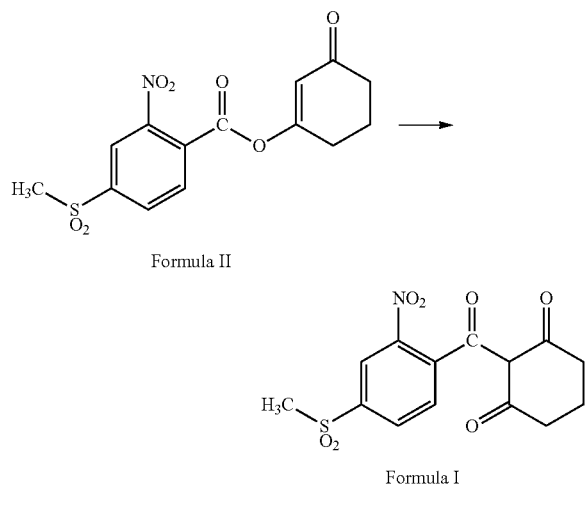

Formula II

Formula I

In various embodiments, the outlined intermediates, namely NMSBA of formula (III) and enol ester of formula (II) may each be isolated if desired, or the reaction sequence can be carried forward without isolation of said intermediates. In addition, all the reaction steps of the above process can also be carried out under reaction conditions suitable for commercial scale, and typically proceed at reaction rates suitable for large scale operations.

In some embodiments, all the reaction steps of the process for producing the final product mesotrione of formula (I) from the starting material NMST of formula (IV) may be conducted in one and the same reaction vessel without isolation of the intermediates of formula (III) and (II) and without difficulty, so that the process of this disclosure may be worked in a facile way and is very advantageous as a commercial process of producing the mesotrione.

According to embodiments of the present disclosure, the conversion of the enol ester of formula (II) to mesotrione can be achieved by any method known in the art.

In one preferred embodiment, the enol ester of formula (II) can be converted into mesotrione by reacting the enol ester of formula (II) with sodium cyanide in presence of a base and a solvent. The solvent may be any solvent in which the enol ester may be soluble. Examples of solvent include dichloromethane, dichloroethane, dichloropropanes, dichlorobutanes, dichloropentanes, and mixtures thereof. Preferably, the solvent can be dichloromethane. The base that can be used for this purpose includes organic and inorganic base. Preferably, the base may be an organic base such as triethylamine, N,N-diisopropylethylamine (DIPEA), N,N-diisopropyl amine, ethanolamine, diethanolamine, triethanolamine or N-methylglucamine. More preferably, the base can be triethylamine. In another embodiment, the disclosed process can produce solvent recovery of >85%.

In some embodiments, mesotrione produced according to the process of the present disclosure may optionally be subjected to purification. Purification of mesotrione may include a conventional procedure known to a person skilled in the art.

While the foregoing describes various embodiments of the disclosure, other and further embodiments of the disclosure may be devised without departing from the basic scope thereof. The invention is not limited to the described embodiments, versions or examples, which are included to enable a person having ordinary skill in the art to make and use the invention when combined with information and knowledge available to the person having ordinary skill in the art.

The present invention is further explained in the form of following examples. However, it is to be understood that the foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

EXAMPLES

Example 1

Synthesis of 2-nitro-4-methylsulphonyl Benzoic Acid (NMSBA) of Formula (III) from 2-nitro-4-methylsulfonyl Toluene (NMST) of Formula (IV)

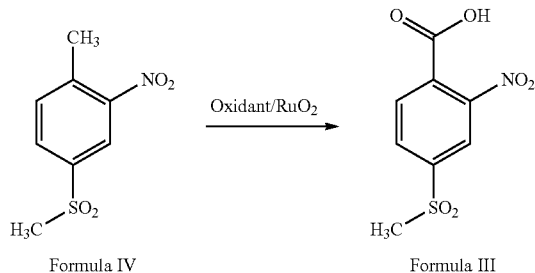 [SMILES: Cc1ccc(S(C)(=O)=O)cc1[N+](=O)[O-] ; CS(=O)(=O)c1ccc(C(=O)O)c([N+](=O)[O-])c1]

Formula IV → Formula III

NMST (61.2 g, 0.278 mol), sodium hypochlorite (500 ml, 0.745 mol) and ruthenium oxide (1.5 g, 0.011 mol) were charged into a 1 L round bottomed flask. This mixture was heated to reflux temperature under stirring for 6-8 hours, cooled to 25-30° C. and filtered. The filtrate obtained was further cooled to 5-10° C. and acidified to pH<3 using concentrated hydrochloric acid (120 mL, 1.23 mol) to form precipitated product (NMSBA). The product obtained was filtered and dried at 50° C. under reduced pressure to obtain NMSBA as light yellow solid.

HPLC purity>95%; Yield: 70%; and Melting point: 210-214° C.

Example 2

Synthesis of 2-nitro-4-methylsulphonyl Benzoic Acid (NMSBA) of Formula (III) from 2-nitro-4-methylsulfonyl Toluene (NMST) of Formula (IV)

NMST (5.0 g, 0.023 mol), sodium hypochlorite (100 ml, 0.149 mol) and ruthenium oxide (0.5 g, 0.004 mol) were charged into a 250 ml round bottomed flask. This mixture was heated to reflux temperature under stirring for 6-8 hours, cooled to 25-30° C. and filtered. The filtrate obtained was further cooled to 5-10° C. and acidified to pH<3 using concentrated hydrochloric acid (18 mL, 0.17 mol) to form precipitated product (NMSBA) The product obtained was filtered and dried at 50° C. under reduced pressure to obtain NMSBA as light yellow solid.

HPLC purity>92%; Yield: 67%; and Melting point: 207-210° C.

Example 3

Synthesis of 2-nitro-4-methylsulphonyl Benzoic Acid (NMSBA) of Formula (III) from 2-nitro-4-methylsulfonyl Toluene (NMST) of Formula (IV)

NMST (20 g, 0.088 mol), sodium hypochlorite (150 ml, 0.222 mol) and ruthenium oxide (0.5 g, 0.004 mol) were charged into a 500 ml round bottomed flask. This mixture was heated to reflux temperature under stirring for 6-8 hours, cooled to 25-30° C. and filtered. The filtrate obtained was further cooled to 5-10° C. and acidified to pH<3 using concentrated hydrochloric acid (54 mL, 0.51 mol) to form precipitated product (NMSBA). The product obtained was filtered and dried at 50° C. under reduced pressure to obtain NMSBA as light yellow solid.

HPLC purity>95%; Yield: 68%; and Melting point: 210-214° C.

Example 4

Synthesis of Enol Ester of Formula (II) from NMSBA of Formula

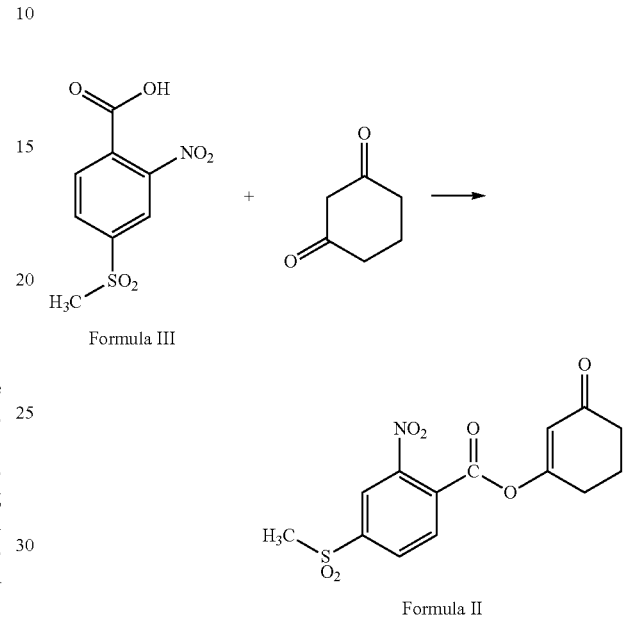

Formula III

Formula II

To a clean and pre-dried 250 mL round bottomed flask, dichloromethane (160 mL) NMSBA (27 g, 0.11 mol) and 1,3-cyclohexanedione (12 g, 0.11 mol) were added under stirring at the temperature of 25-30° C. To this mixture, N,N'-dicyclohexylcarbodiimide (DCC) (24 g, 0.12 mol) was added and stirred for about 2 hours at 25-30° C. The reaction mixture was quenched with water (160 mL) and separated the organic layer. The organic layer obtained was concentrated to obtain enol ester as white crystalline solid.

HPLC purity>85%; Yield: 25.4 g (68%); Melting point: 158-163° C. and Solvent recovery: >85%.

Example 5

Synthesis of Enol Ester of Formula (II) from NMSBA of Formula (III)

To a clean and pre-dried 100 mL round bottomed flask, dichloromethane (10 mL) NMSBA (1.0 g, 0.004 mol) and N,N'-dicyclohexylcarbodiimide (DCC) (0.8 g, 0.004 mol) were added under stirring at the temperature of 25-30° C. To this mixture, 1, 3-cyclohexanedione (0.45 g, 0.004 mol) was added and stirred for about 2 hours at 25-30° C. The reaction mixture was quenched with water (10 mL) and separated the organic layer. The organic layer obtained was concentrated to obtain enol ester as off white crystalline solid. HPLC purity>85%; Yield: 0.89 g (65%); Melting point 152-158° C.

Example 6

Synthesis of Enol Ester of Formula (II) from NMSBA of Formula (III)

To a clean and pre-dried 250 mL round bottomed flask, dichloromethane (100 mL) NMSBA (25 g, 0.10 mol) and 1, 3-cyclohexanedione (12 g, 0.11 mol) were added under stirring at the temperature of 25-30° C. To this mixture, N,N'-dicyclohexylcarbodiimide (DCC) (21 g, 0.10 mol) was added and stirred for about 2 hours at 25-30° C. The reaction mixture was filtered under vacuum to obtain the wet cake. The wet cake is dried to obtain the crude enol ester. The crude enol ester with water was filtered under vacuum to obtain pure enol ester as off white colour solid.

HPLC purity>85%; Yield: 22.8 g (66%). Melting point 157-163° C. and Solvent recovery>85%.

Example 7

Synthesis of Mesotrione from Enol Ester of Formula (II)

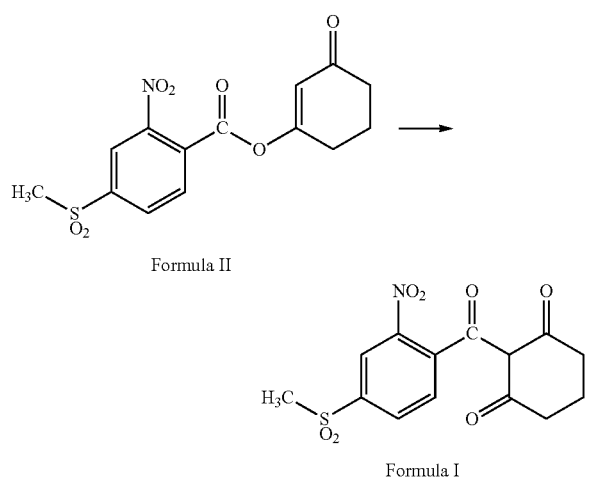

A mixture of enol ester (20 g, 0.06 mol) and dichloromethane (60 mL) taken in a clean, pre-dried 250 mL round bottomed flask and cooled to 10-15° C. To this mixture, added sodium cyanide (1.2 g, 0.025 mol) followed by slow addition of triethylamine (6.6 g, 0.065 mol) for 15-20 mins at 10-15° C. under stirring. The reaction mixture is cooled at 10-15° C. and maintained for about 2 hours and quenched with water (100 mL). Dichloromethane was separated through distillation under reduced pressure at 35-45° C. The aqueous mass obtained was cooled to 5-10° C. and acidified to pH<3 using aqueous hydrochloric acid (5.4 mL, 0.054 mol). The precipitated product obtained was separated through filtration, washed with water (60 mL) and dried under reduced pressure to obtain mesotrione as yellow to tan colour solid.

HPLC purity>95%; Yield: 17 g (85%); Melting point of the solid was 155-157° C.; and solvent recovery: >85%.

A skilled art is an will appreciate that the quantity and type of each ingredient can be used in different combinations or singly. All such variations and combinations would be falling within the scope of present disclosure.

The foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

We claim:

1. A process for preparation of mesotrione of formula (I), which comprises:

(i) oxidizing 2-nitro-4-methylsulfonyl toluene (NMST) of formula (IV) using an oxidant in presence of ruthenium oxide as a catalyst, to produce 2-nitro-4-methylsulphonyl benzoic acid (NMSBA) of formula (III);

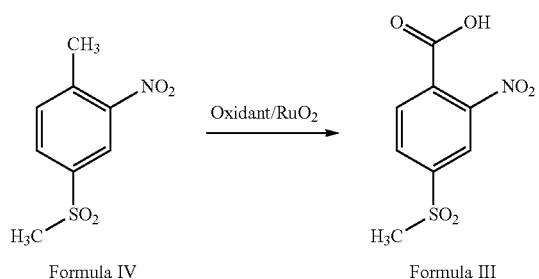 [SMILES: Cc1ccc(S(C)(=O)=O)cc1[N+](=O)[O-] ; CS(=O)(=O)c1ccc(C(=O)O)c([N+](=O)[O-])c1]

(ii) reacting NMSBA of formula (III) with 1,3-cyclohexanedione to produce an enol ester of formula (II); and

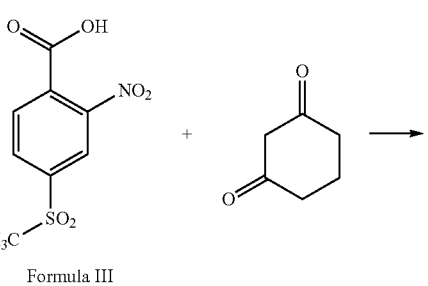

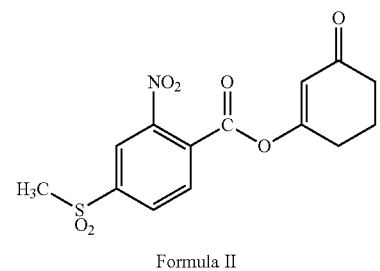

(iii) converting the enol ester of formula (II) to mesotrione of formula (I)

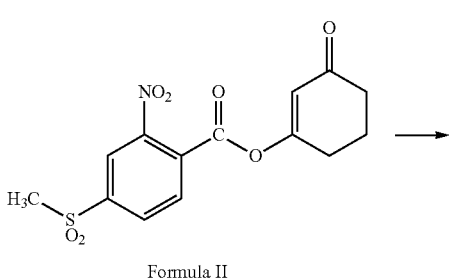

17

-continued

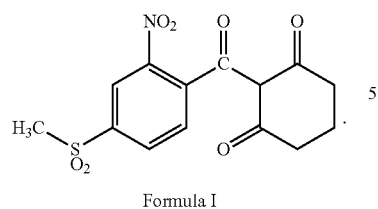

Formula I

2. The process for preparation of mesotrione as claimed in claim 1, wherein the oxidant is sodium hypochlorite.

3. The process for preparation of mesotrione as claimed in claim 1, wherein the reaction of NMSBA of formula (III) with 1,3-cyclohexanedione is carried out in presence of N,N'-dicyclohexylcarbodiimide and a solvent.

4. The process for preparation of mesotrione as claimed in claim 1, wherein the conversion of the enol ester of formula (II) to mesotrione of formula (I) comprises reaction of the enol ester of formula (II) with sodium cyanide in presence of a base and a solvent to produce mesotrione of formula (I).

5. A process for preparation of 2-nitro-4-methylsulphonyl benzoic acid (NMSBA) of formula (III) by oxidizing 2-nitro-4-methylsulfonyl toluene (NMST) of formula (IV) using an oxidant in presence of ruthenium oxide as a catalyst.

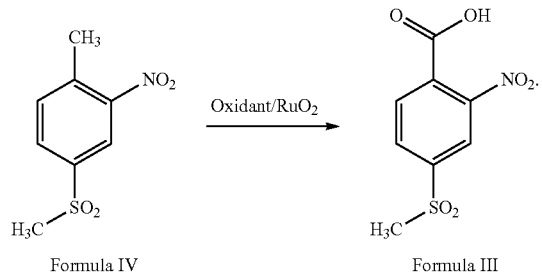 [SMILES: Cc1ccc(S(C)(=O)=O)cc1[N+](=O)[O-] ; CS(=O)(=O)c1ccc(C(=O)O)c([N+](=O)[O-])c1]

6. The process for preparation of 2-nitro-4-methylsulphonyl benzoic acid (NMSBA) as claimed in claim 5, wherein the oxidant is sodium hypochlorite.

7. A process for preparation of an enol ester of formula (II) by reaction of 2-nitro-4-methylsulphonyl benzoic acid (NMSBA) of formula (III) with 1,3-cyclohexanedione

18

-continued

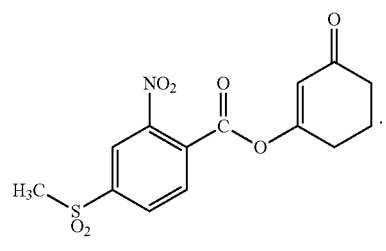

Formula II

8. The process for preparation of an enol ester as claimed in claim 7, wherein the reaction is carried out in presence of N,N'-dicyclohexylcarbodiimide and a solvent.

9. The process for preparation of an enol ester as claimed in claim 8, wherein the solvent is selected from the group consisting of dichloromethane, 1,2-dichloroethane, dichloropropanes, dichlorobutanes, dichloropentanes, and mixtures thereof.

10. A process for preparation of an enol ester of formula (II) using 2-nitro-4-methylsulfonyl toluene (NMST) of formula (IV) as starting material, wherein the process comprises the steps of:

(i) oxidizing 2-nitro-4-methylsulfonyl toluene (NMST) of formula (IV) using an oxidant in presence of ruthenium oxide as a catalyst, to produce 2-nitro-4-methylsulphonyl benzoic acid (NMSBA) of formula (III); and

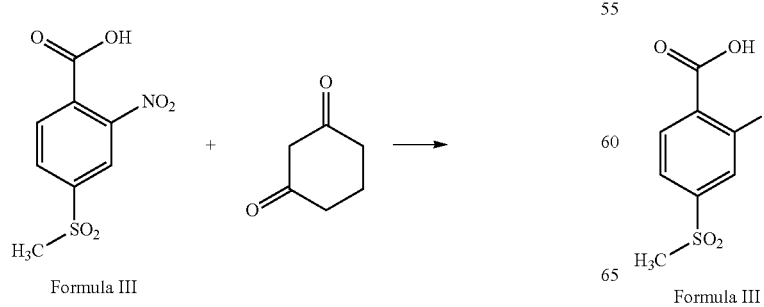

(ii) reacting NMSBA of formula (III) with 1,3-cyclohexanedione to produce the enol ester of formula (II)

-continued
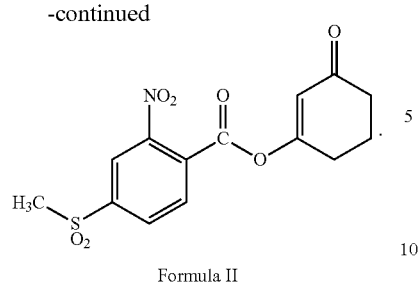
Formula II
* * * * *